United States Patent [19]
Wood et al.

[11] 4,056,163
[45] Nov. 1, 1977

[54] TRACKING BANDPASS FILTER FOR CONDITIONING VIBRATOR ACCELEROMETER WAVEFORM

[75] Inventors: George William Wood, Dallas; John James Sallas, Richardson, both of Tex.

[73] Assignee: Texas Instruments Incorporated, Dallas, Tex.

[21] Appl. No.: 573,498

[22] Filed: May 1, 1975

[51] Int. Cl.² .............................................. G01V 1/02
[52] U.S. Cl. ............................. 181/113; 340/15.5 TC; 340/15.5 TD
[58] Field of Search ......... 340/17, 15.5 TA, 15.5 TC, 340/15.5 TD; 181/113, 114, 401

[56] References Cited
U.S. PATENT DOCUMENTS

| | | | |
|---|---|---|---|
| 3,698,508 | 10/1972 | Landrum, Jr. | 340/15.5 TC |
| 3,721,954 | 3/1973 | Fontanel et al. | 340/15.5 TC |
| 3,858,170 | 12/1974 | Freeman et al. | 340/17 |
| 3,863,202 | 1/1975 | Landrum, Jr. | 340/17 |
| 3,881,167 | 4/1975 | Pelton et al. | 340/15.5 TC |

Primary Examiner—Maynard R. Wilbur
Assistant Examiner—T. M. Blum
Attorney, Agent, or Firm—Harold Levine; Rene' E. Grossman; Thomas G. Devine

[57] ABSTRACT

An accelerometer located on the pad of a vibratory seismic source provides a signal for comparison with the sweep signal which controls the vibrator. The error function representing the difference between the phases of these two signals is used to adjust the phase of the vibrator so as to maintain the vibrator in synchronism with the sweep signal. Prior to comparison with the sweep signal, the accelerometer output is conditioned by a tracking bandpass filter having its center frequency slaved to the instantaneous sweep frequency. Those components of the accelerometer output signal having a frequency equal to the instantaneous sweep frequency are passed by the bandpass filter and are subjected to approximately 0° phase shift through the filter.

18 Claims, 4 Drawing Figures

TRACKING BANDPASS FILTER FOR CONDITIONING VIBRATOR ACCELEROMETER WAVEFORM

This invention relates to the control of vibratory seismic sources and in particular to the use of a tracking bandpass filter in the phase control loop of a vibratory seismic source.

Among the various types of seismic sources known in the art is a class of sources which impart vibratory seismic energy to the ground over some finite period of time. Among such sources, for example, is the type sometimes referred to by the name "Vibroseis" seismic source a trademark of Continental Oil Company. Briefly considering the characteristics of such vibratory sources necessary to an understanding of the present invention, the vibrators typically comprise a piston which is mechanically coupled to a pad or baseplate, the latter being in contact with the ground for imparting vibratory motion thereto. The piston is adapted to move along a vertical axis within the confines of a cylinder which forms a part of a heavy reaction mass. Hydraulic fluid, under the control of a servovalve, is alternately introduced to the portions of the cylinder above and below the piston thereby resulting in a reciprocating reaction force between the piston and the reaction mass. As a result of the large inertia of the reaction mass, these reciprocating forces operating on the piston are transmitted to the pad and ultimately to the earth.

It has become known to provide such systems with means for generating an electrical signal representative of the actual movement of the vibrator. Typically, such means may comprise an accelerometer mounted on the baseplate. After appropriate conditioning, the signal provided by the accelerometer is compared with a reference signal which represents the desired motion of the vibrator. The error signal resulting from this comparison, after further conditioning, is used to control the operation of the aforementioned servovalve so as to cause the vibrator motion to faithfully track the reference signal. One such improved system is the subject of copending U.S. patent application Ser. No. 501,410, filed Aug. 28, 1974 entitled "Method and System for Achieving Vibrator Phase Lock," and assigned to the assignee of the present invention.

Various networks for conditioning the signal representative of the vibrator motion have become known to those skilled in the art. As already mentioned, the means for providing a signal representative of the vibrator motion commonly comprises an accelerometer. Since the accelerometer provides the second derivative of the vibrator displacement, whereas the reference signal typically represents the desired displacement of the vibrator, it has been become known to process the accelerometer signal through a double integrator prior to comparison with the reference signal. Each stage of the double integrator may comprise, as is well known in the art, an operational amplifier having an input resistor and suitable feedback capacitor. While it is well known that all practical integrator circuits depart from the action of a true integrator at some very low frequency, it is generally required that the frequency response of the integrator be of the form $K/j\omega$ over the entire operating frequency range of the vibrator, the variable $\omega$ representing radian frequency. This leads to difficulty when the vibrator is operating at the higher frequencies of its range. In such case the gain to low frequency distortion components is seen to be higher than the gain at the operating frequency. The strongly amplified distortion components may result in spurious error signals from the comparator and cause the vibrator to loose phase lock. As a result, vibrators using the double integrator for accelerometer conditioning have a severe limitation on their upper frequency and bandwidth of operation.

The high gain at low frequencies characteristic of the double integrator circuit is particularly objectionable in a typical vibrator application. As is well known, seismic vibrators are commonly mounted on trucks with means for lowering the vibrator and raising at least a portion of the truck off the ground so as to apply a hold down force to the vibrator. Typically, after the pad has been lowered the vibrator is energized so as to impart a sweep waveform to the earth over a period of about 10 seconds. At the conclusion of the sweep, the pad is raised and the truck moved to a new location where the pad is lowered in preparation for the next sweep. The period of time required to raise the pad, move the truck, and lower the pad again may typically be only 10 or 15 seconds, that is of the same order of magnitude as the period of a sweep. The raising and lowering of the pad and the movement of the truck cause large low frequency signals in the accelerometer output waveform. These large low frequency components when amplified by the double integrator interfere with phase locking the vibrator during the sweep, particularly at the high frequencies of the sweep.

In an effort to overcome the aforementioned problem some vibrators have been provided with an AC coupled double integrator for conditioning the accelerometer output signal. As a result of the AC coupling, the gain of the integrator network at low frequencies is not as high as with the DC coupled integrators and the problem with low frequency distortion components is, to some extent, obviated. While the AC coupling tends to reduce the gain of the double integrator at very low frequencies, the gain of this type of conditioning circuit must still decrease, with increasing frequency through the band of frequencies to be generated by the vibrator. As a result, AC coupling of the integrators is only partially successful in resolving the difficulty with low frequency components. In addition, the AC coupled integrator does not have a constant 180° phase shift as does the DC coupled double integrator but rather has a phase shift which varies as a function of frequency. This varying phase shift must be accounted for if the vibrator displacement is to follow the reference waveform. One way to account for this varying phase shift is to pass the reference signal through a second similar AC coupled double integrator prior to comparison with the accelerometer signal. In this way both the reference and accelerometer signals are subjected to the same phase shift prior to comparison thereby ensuring that the vibrator is in phase lock with the reference signal. Another way to account for the phase shift is to permit the phase of the vibrator motion to differ from that of the reference signal by the phase shift through the AC coupled integrator and to account for this varying phase shift at a later time during processing of the data received by the geophones. It is emphasized, however, that neither of these approaches accounting for the phase shift resolves the aforementioned problem stemming from the high gain of the double integrator at low frequencies.

Another approach to the resolution of this problem involves the use of tracking low pass filters. This approach is discussed briefly in Mandrel Industries Inc.

Field Engineering Bulletin No. 136, issue date Feb. 8, 1973, and entitled "New Operational Tracking Filter." In this system the accelerometer signal conditioning network contains, in addition to a double integrator, a low pass filter having a variable break frequency. The break frequency of this tracking low pass filter varies under control of the sweep generator so as to substantially track the instantaneous frequency of the desired sweep waveform. As a result, the filter rejects frequencies above the instantaneous sweep frequency while maintaining a substantially flat response for frequencies below the instantaneous frequency. While the use of tracking low pass filters tends to lessen the problem resulting from high gain at low frequencies, it is not a complete solution to the problem. In addition, the tracking low pass filters also introduce phase shift at the instantaneous frequency of the vibrator which must be accounted for as discussed above.

It is therefore an object of the invention to provide a vibratory seismic energy source capable of high frequency operation.

It is another object of the invention to provide a broad band vibratory energy source.

These and other objects are realized by the present vibratory seismic source which employs a tracking bandpass filter to condition the accelerometer output waveform. Briefly, the source in one aspect includes digital means for generating a signal representative of a desired vibrator sweep waveform. A digital to analog converter responds to the digital signal to produce an analog signal for controlling the hydraulic servovalve of a vibrator. The resultant motion of the vibrator is sensed by an accelerometer located on the baseplate of the vibrator. The accelerometer output signal is conditioned by a tracking bandpass filter, the center frequency of which under the control of the aforementioned digital means tracks the instantaneous frequency of the desired sweep waveform. One tunable bandpass filter is disclosed in "Nonlinear Circuits Handbook," published by Analog Devices, Inc. of Norwood, Mass., at pp 140–41. The output of the tracking bandpass filter, after further conditioning in an automatic gain control circuit (AGC), provides one input to a phase comparator circuit. The other input to the phase comparator circuit is a reference signal provided by the aforementioned digital means and representative of the polarity of the desired sweep signal. The error signal generated by the phase comparator is used to control the digital signal input to the digital to analog converter so as to maintain the vibrator motion in phase synchronism with the desired sweep waveform.

A vibrator embodying the principles of the present invention has been tested in the field and was found to be capable of maintaining phase lock at frequencies above 250 hertz. The same vibrator when using a conventional AC coupled double integrator was incapable of maintaining phase lock at frequencies above 90 hertz.

Other features and objects of the invention will be made clear by a consideration of the following detailed description when read in connection with the attached drawings wherein.

Figure 1:
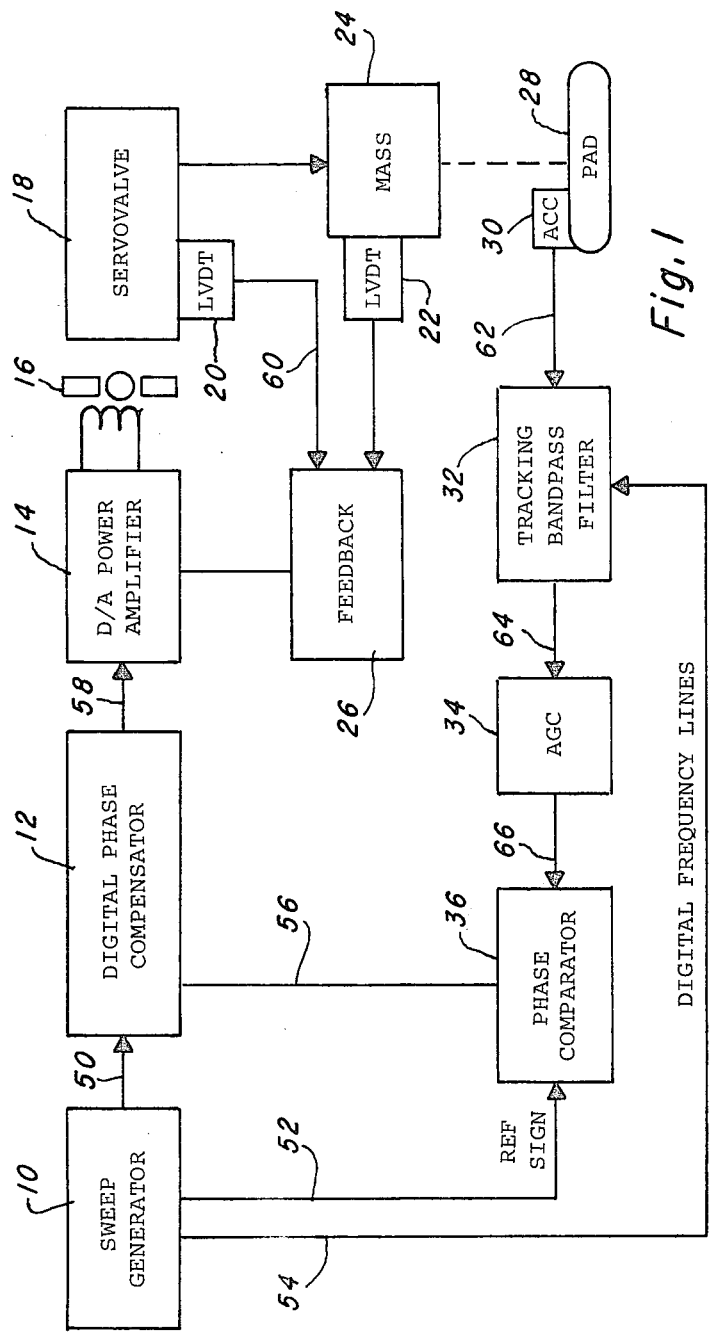
FIG. 1 is a block diagram of a vibrator system with the improved conditioning network.

With reference to FIG. 1, there is shown in block diagram form one embodiment of the vibratory seismic source. Sweep generator 10 by means of the digital signals provided on lines 50, 52 and 54 controls the operation of the source and in particular establishes the waveform which is ultimately coupled to the ground by pad 28. Sweep generator 100 provides on line 50 pulse train, the pulse repetition rate of which is variable so as to control the frequency of oscillation of pad 28. The pulse repetition rate of the signal appearing on line 50 is modified in digital phase compensator 12 under the control of a digital signal appearing on line 56. This permits momentary increases or decreases in the pulse repetition rate which ultimately result in the required changes in the phase of the oscillations of pad 28.

The pulse train, after modification under the control of the digital signal appearing on line 56, is coupled to the input of a binary counter, the output of which cyclically poles the address locations of a read only memory (ROM). The ROM contains, in sequential storage locations, sampled values of a sinusoidal waveform. These sinewave sampled values read out of the ROM comprise the output of digital compensator 12 appearing on line 58. The signal appearing on line 58 is a digital time series comprising a sampled data sinewave function. The elements of digital phase compensator 12 as well as of phase comparator 36 are disclosed in greater detail in the aforementioned co-pending U.S. patent application Ser. No. 501,410.

The sample data sinusoid appearing on line 58 is coupled to the input of digital to analog converter-power amplifier unit 14. The digital to analog converter provides an analog sinusoid which is amplified by the power amplifier so as to be capable of driving torque motor 16. Torque motor 16 in turn operates servovalve 18 so as to regulate the flow of hydraulic fluid within the vibrator and thereby regulate the reaction forces generated between mass 24 and pad 28. In this way pad 28 caused to reciprocate along a substantially vertical axis and impart elastic waves to the underlying earth material.

Linear variable differential transducer 20 provides an electrical signal representative of the position of servovalve 18. This electrical signal is coupled by line 60 to feedback unit 26 which conditions the electrical signal before feeding it back to the power amplifier in digital to analog converter-power amplifier unit 14. Feedback unit 26 may simply comprise means for demodulating the output of linear variable differential transducer 20 and adding a controllable offset to the demodulated signal so as to center servovalve 18. The closed loop system accurately positions valve 18 in accordance with the analog sinusoid provided by the digital to analog converter. In a similar manner linear variable differential transducer 22 provides an electrical signal representative of the position of mass 24. This signal, after conditioning, is also ultimately fed back to the power amplifier so as to form a closed loop system for controlling the movement of mass 24.

One specific type of vibrator system comprising elements corresponding to elements 14, 16, 18, 20, 22, 24, 26 and 28 of FIG. 1 is disclosed in greater detail in co-pending U.S. patent application Ser. No. 355,838, filed Apr. 30, 1973, entitled "Servo Hydraulic Transducer and Method of Operation" and assigned to the assignee of the present invention. While that application provides a detailed description of the elements just discussed from FIG. 1, it also discloses a unique hydraulic system and method of operating the hydraulic system. While that unique hydraulic system may be incorporated as a portion of the present invention, it is to be understood that the present invention is not so restricted and may incorporate other hydraulic systems and methods of operation.

Returning to FIG. 1 an accelerometer 30 is mounted on pad 28 so as to provide on line 62 an electrical signal representative of the motion of pad 28. Accelerometer 30 may be any of a wide variety of commercially available units. One such unit is a model EA-26 accelerometer manufactured by Electro-Technical Labs of Houston, Tex. The electrical acceleration signal appearing on line 62 is conditioned by tracking bandpass filter 32. Tracking bandpass filter 32 is a sharply tuned bandpass filter having a center frequency which is variable under control of the digital signal appearing on line 54 and provided by sweep generator 10. This digital signal is continuously representative of the instantaneous frequency of the sweep signal which in turn is under control of the pulse train appearing on line 50. In this way the center frequency of tracking bandpass filter 32 is at all times maintained at the desired frequency of oscillation of pad 28 so that tracking bandpass filter 32 is optimally conditioned to process the fundamental component generated by accelerometer 30 to the relative rejection of all other frequencies. In this way tracking bandpass filter 32 is capable of substantially suppressing distortion components at frequencies both above and below the desired frequency of operation and as a result permits locking the phase of the pad oscillation to the phase of the signal generated by sweep generator 10 at frequencies much higher than has previously been possible.

The output of tracking bandpass filter 32 is coupled by line 64 to the input of automatic gain control unit (AGC) 34 for further conditioning. AGC unit 34 in the preferred embodiment may be simply an overdriven amplifier having an output which is substantially a square wave with zero crossings which coincide with the zero crossings of the input signal appearing on line 64. This square wave output signal appearing on line 66 is coupled to one input of phase comparator 36. Phase comparator 36 compares the phase of the signal appearing on line 52. As will be discussed in greater detail subsequently, the reference signal appearing on line 52 is a two level signal which changes state at the zero crossings of the desired sweep signal. In other words, the reference signal appearing on line 52 is either in a high or low state in accordance with whether the individual sinusoid of the desired sweep waveform is in a positive or negative portion of its cycle. It will be recognized by those skilled in the art that phase comparator 36 then compares the phase of the pad 28 motion with the phase of the desired sweep signal and provides an error signal on line 56 which is representative of the degree and direction of any phase difference. The error signals appearing on line 56 are used in digital phase compensator 12 to modify the pulse repetition rate of the pulse train appearing on line 50 so as to maintain the pad 28 motion in phase synchronism with the desired sweep signal as generated by sweep generator 10.

Figure 2:
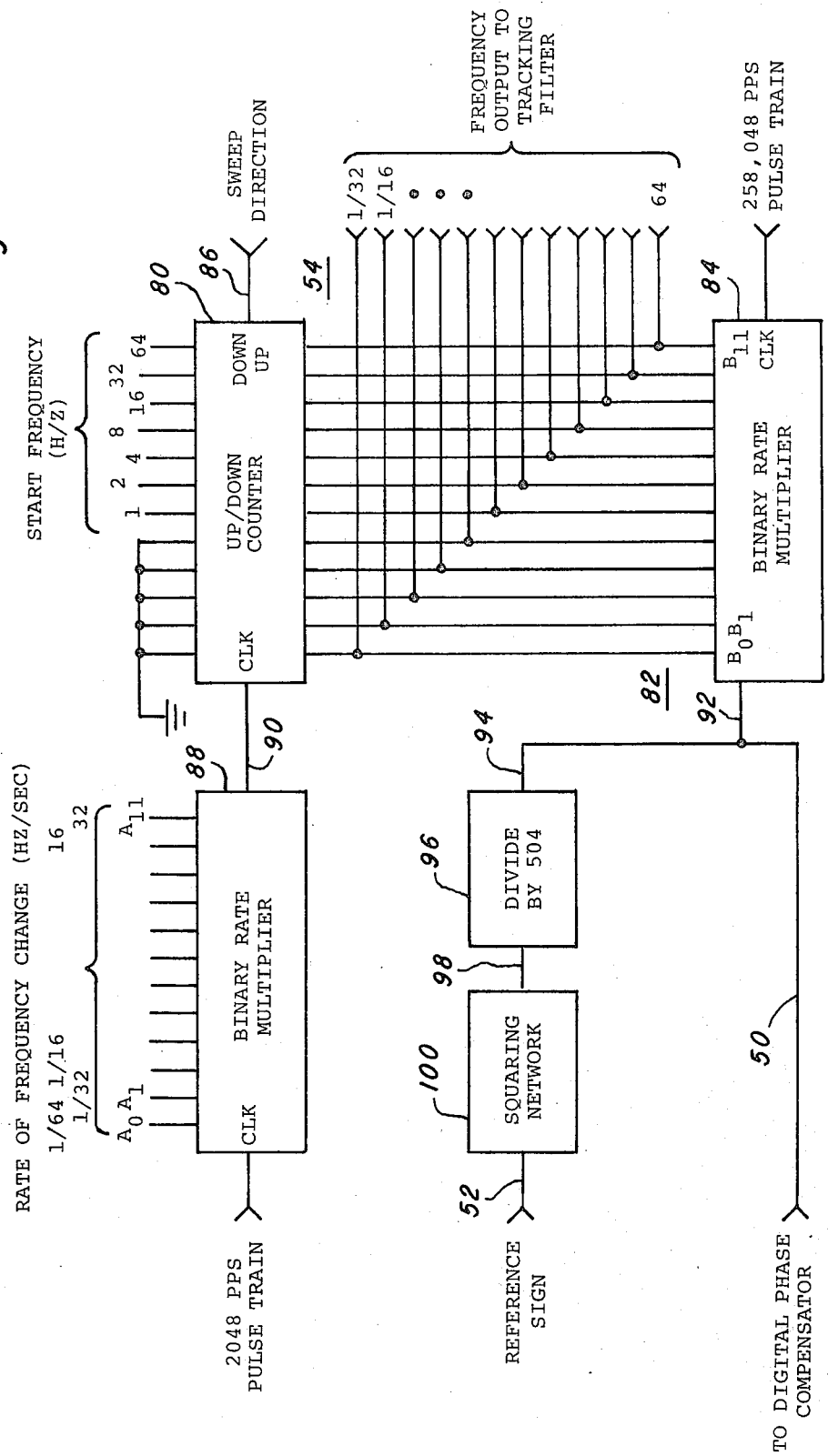
FIG. 2 is a block diagram of a sweep generator.

A detailed block diagram of sweep generator 10 appears in FIG. 2. Referring now to FIG. 2, up/down binary counter 80 provides at its output Q terminals, a 12 bit binary number representative of the desired instantaneous frequency of operation for the vibrator. The frequency value associated with any of these 12 Q output terminals which appear across the bottom of block 80 in FIG. 2 may be selected arbitrarily. In the preferred embodiment, for example, as shown in FIG. 2 a change in the state of the least significant bit of the up/down counter output is representative of a frequency change of 1/32 hertz. The more significant bits are assigned frequency significance in increasing powers of two so that the most significant output bit of up/down counter 80 represents a frequency of 64 hertz. As shown in FIGS. 1 and 2, this digital frequency signal is coupled to control tracking bandpass filter 32 by lines 54. The 12 bit binary frequency signal is also coupled to binary rate multiplier 84 by lines 82. In the preferred embodiment, up/down counter 80 comprises three 4 bit synchronous up/down counters, Model No. SN74191 manufactured by Texas Instruments Incorporated of Dallas, Tex. The three 4 bit up/down counters are connected as shown in the manufacturer's circuit bulletin to function as a single 12 bit up/down counter. As shown by the 12 input lines appearing across the top of block 80 in FIG. 2, each of which shares a one-to-one relationship with one of the twelve output lines, it is possible to establish initial values for the twelve bits by appropriately controlling the state of the twelve input lines prior to initiating the counting action. In the preferred embodiment, as seen in FIG. 2, the five least significant input bits are permanently affixed to ground and thereby have an initial value of zero. The seven most significant bits are connected to a 7 bit start frequency input so that the start frequency of the sweep may be selected to be any integer number of hertz from one to 127. A sweep direction input appearing on line 86 is connected to the down/up terminal of the counter to determine the direction of the sweep. Until a pulse is received at the clock terminal of counter 80, the sweep frequency represented by its output binary number will remain constant at the established initial value. Pulses from binary rate multiplier (BRM) 88 appearing on line 90 will increment the output count of counter 80 in a direction determined by the state of the signal appearing on line 86. BRM 88, in the preferred embodiment, comprises two 6 bit binary rate multipliers, Model No. SN7497 also manufactured by Texas Instruments Incorporated. The two 6 bit multipliers are combined as disclosed in the manufacturers circuit bulletin so as to form a single 12 bit BRM. BRM 88 has 12 rate inputs, labled $A_0$ through $A_{11}$ in FIG. 2. Coupled to these 12 inputs is a 12 bit binary number representative of the desired rate of frequency change in hertz/second. These 12 bit positions, in increasing order of significance, are assigned rate of change values ranging from 1/64th hertz/second to 32 hertz/second. The output of BRM 88 appearing on line 90 is a pulse train having a pulse repetition rate given by equation (1) below:

$$\text{Pulse repetition rate} = (2048/4096) \cdot \sum_{i=0}^{11} A_i 2^i \text{ pulses per second} \quad (1)$$

where $A_i$ is either zero or one in accordance with whether input bit $i$ is off or on.

Consideration of a representative situation may be helpful in understanding the operation of the circuit of FIG. 2. If, for example, only the 1/32 hertz/second input to BRM 88 is in the high state, all of the other eleven rate inputs being low, then as seen in equation (1) the pulse repetition rate of the pulse train on line 90 will be 1 pulse per second. This will cause the output count of counter 80, appearing on either lines 54 or 82, to change so as to reflect a frequency change of 1/32 hertz each second. If the sweep direction signal is such as to cause counter 80 to count in the up direction, for example, the frequency output to the tracking filter will begin to increase from its initial value at a rate of 1/32 hertz per second.

Turning next to the operation of BRM 84, its 12 rate inputs $B_0$ through $B_{11}$ are coupled by lines 82 to the 12 bit frequency output of coutner 80. The clock input of BRM 84 is coupled to an input pulse train with a pulse repetition rate of 258,048 pulses per second. The output of BRM 84, appearing on line 92, is given by equation (2) below:

$$\text{Pulse repetition rate} = (258{,}048/4096) \cdot \sum_{i=0}^{11} B_i 2^i \text{ pulses per second}, \quad (2)$$

where $B_i$ is either zero or one in accordance with whether bit $i$ of the line 82 signal is low or high.

Again, by way of example, if only the 1 hertz output of counter 80 is in the high state, all the other binary bits being in the low state, then from equation (2) the pulse repetition rate of the signal appearing on line 92 will have a value of 2,016 pulses per second. As disclosed in U.S. patent application Ser. No. 501,410, this pulse repetition rate is further divided in digital phase compensator 12 by a factor of 8 before it is used to clock the up/down counter which poles the read only memory of digital phase compensator 12. As a result, when the frequency output of counter 80 is in the 1 hertz state, the addresses of the read only memory are read at a rate of 252 addresses per second. This is precisely the rate at which the addresses must be read to cycle up and down through the ROM memory twice in 1 second so as to produce one full cycle of analog sinewave in exactly 1 second.

The pulse train appearing on line 92 is also coupled by line 94 to a divide network 96 which divides the pulse repetition rate by a factor of 504. The output of divide network 96 is coupled by line 98 to squaring network 100. Squaring network 100 may comprise two bistable flip-flops in series, the first flip-flop being responsive to the pulse train appearing on line 98. As a result the reference sign signal appearing on line 102 is a square wave which undergoes one full cycle for each 2,016 pulses appearing on line 94. It will be recalled that in the previous example where only the 1 hertz output of counter 80 was in the high state the corresponding pulse repetition rate on line 92 was 2,016 pulses per second. It follows that under these conditions the square wave appearing on line 102 has a fundamental frequency of 1 hertz. This square wave, which represents the polarity of the desired sweep waveform, is coupled to phase comparator 36 by line 52.

The input signals labeled "rate of frequency change" and "start frequency" may be derived from operator's panel switches which are appropriately set by an operator prior to operation of the vibrator. Alternatively, the operator's panel may be configured to permit the selection of a start and end frequency and a sweep length, all in decimal form. Conventional logic circuits may be employed to convert these decimal numbers to binary numbers representative of rate of frequency change and start frequency.

Figure 3:
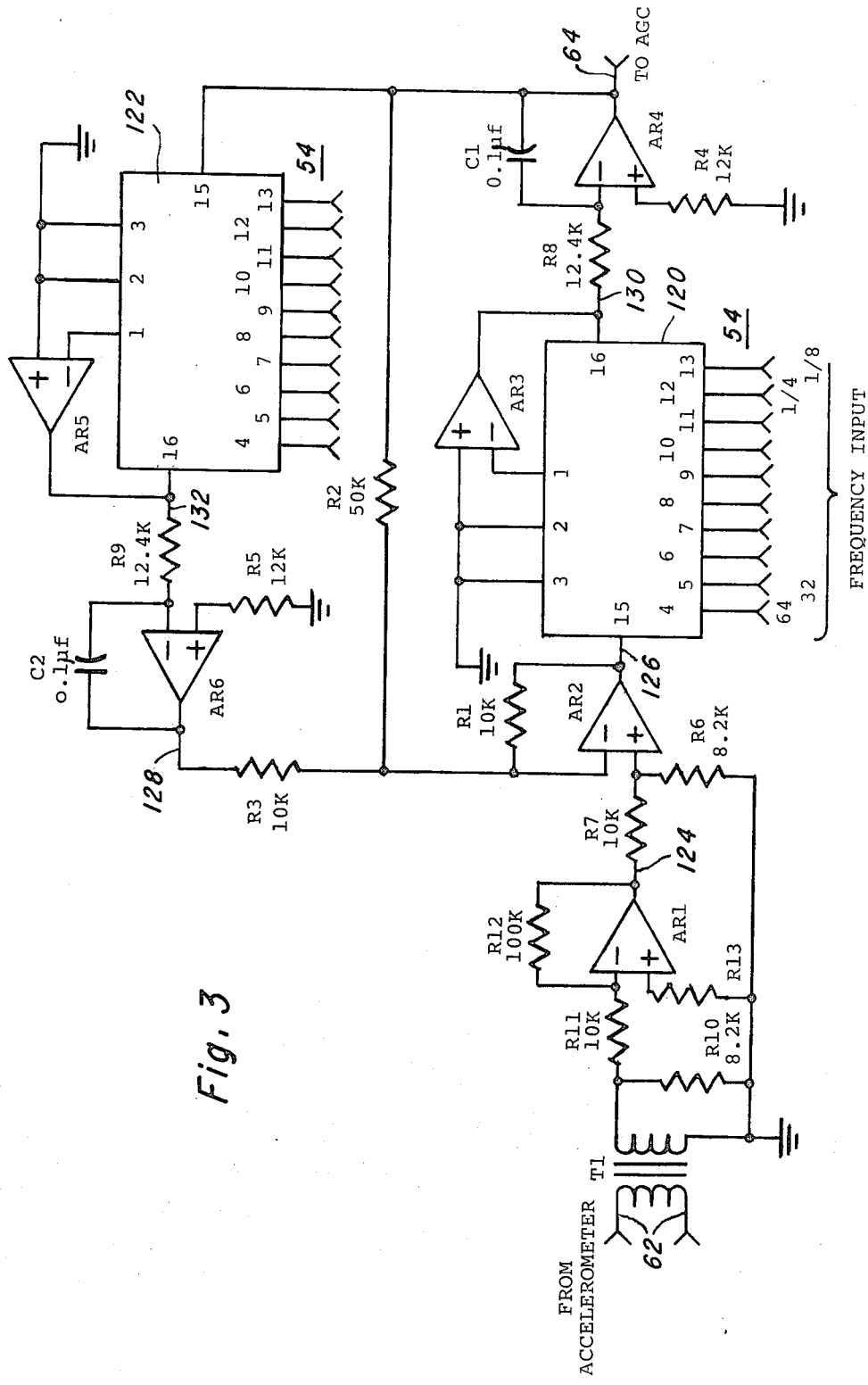
FIG. 3 is a schematic diagram of a tracking bandpass filter.

The structure of tracking bandpass filter 32 is illustrated by the schematic diagram of FIG. 3. In FIG. 3, operational amplifiers AR1 through AR6 may each be a Model SN72558 integrated circuit manufactured by Texas Instruments Incorporated of Dallas, Tex. Components 120 and 122 are each multiplying D/A converter, Model AD7520 manufactured by Analog Devices Inc. of Norwood, Mass. While in the preferred embodiment the Model AD7520 with its 10 bit digital input is employed, it may be desireable in some cases to use a 12 bit Model AD7521 or other similar multiplying D/A converter.

As seen in FIG. 3, the output from accelerometer 30 appearing on line 62 is transformer coupled by an input transformer T1 to the tracking bandpass filter. The signal from the secondary of the input transformer is coupled to a conventional inverting operational amplifier AR1 having a closed loop gain of 10. During the discussion of FIG. 3, voltages appearing at various points in the circuit will be designated by a V followed by the reference designator assigned to the particular point in the circuit. Thus, the voltage at the output of operational amplifier AR1 appearing on line 124 will be designated V124.

Voltage V124 is coupled through resistor R7 to operational amplifier AR2 which, as seen in FIG. 3, is also responsive to feedback from voltages V126, V64, and V128. The output of amplifier AR2, V126, is given by equation (3):

$$V126 = V124[R6/(R6+R7)] \cdot (1 + R1/R3 + R1/R2) \\ - (R1/R2)V64 - (R1/R3)V128 \quad (3)$$

Voltage V126 provides the reference input voltage to multiplying D/A converter 120.

It will be recalled from FIG. 2 that sweep generator 10 provides a 12 bit frequency output to the tracking filter on line 54. Since the Model AD7520 converter used in the preferred embodiment has only a 10 bit digital input, only the ten most significant bits from the sweep generator are employed by the tracking filter. Thus, as seen in FIG. 3, the most significant bit on lines 54, that is the bit corresponding to a frequency of 64 hertz, is coupled to terminal 4 of converter 120. The least significant bit which is coupled to terminal 13 of converter 120 corresponds to a frequency of ⅛ hertz. In the following equations the variable FREQ will be the frequency represented by the binary number itself. In other words, with the frequency significance assigned to the binary number as shown in FIG. 3, the variable FREQ will have a value equal to one-eighth the binary number. Converter 120 when combined with operational amplifier AR3 as illustrated in FIG. 3, performs the function of multiplying input voltage V126 by the analog equivalent of the digital number coupled to terminals 4–13. The output voltage of converter 120, V130 is given by equation (4):

$$V130 = -(FREQ/128)V126. \quad (4)$$

Operational amplifier AR4 along with its feedback network performs the function of an inverting integrator so that, in terms of its steady state response, the output voltage of the tracking bandpass filter V64 is given by equation (5):

$$V64 = -(1/j\, 2\pi f\, R8C1)\, V130, \quad (5)$$

where $j = \sqrt{-1}$ and $f$ is frequency.

It will be noted that V64 is also fed back to the negative input of amplifier AR2 through resistor R2. Voltage V64 also provides the reference input voltage to multiplying D/A converter 122. Converter 122 cooperates with operational amplifier AR5 to perform the function of multiplying the voltage V64 by the analog voltage corresponding to the digital number coupled to its terminals 4–13. This digital number is also the frequency input appearing on lines 54 which is coupled to converter 122 in exactly the same manner as to converter 120. The most significant bit corresponding to a frequency of 64 hertz, for example, is coupled to terminals 4 of both converters 120 and 122. As a result V132, the output of converter 122 is as given by equation (6):

$$V132 = -(FREQ/128) \, V64. \qquad (6)$$

Operational amplifier AR6 along with its feedback network comprised of resistor R9 and capacitor C2 also functions as an inverting integrator so that voltage V128 is given by equation (7):

$$V128 = -(1/j2\pi f R9 C2) \, V132 \qquad (7)$$

Voltage V128 is fed back through resistor R3 to the negative input of operational amplifier AR2. Combining equations (3)–(7) and substituting component values as given in FIG. 3, the overall steady state transfer function of the tracking bandpass filter, that is, the ratio of V64 to V124 is given by equation (8):

$$V64/V124 = \frac{\frac{10 jf}{FREQ}}{1 + \frac{0.2 jf}{FREQ} - \left(\frac{f}{FREQ}\right)^2} \qquad (8)$$

This will be recognized as the transfer function of a second order bandpass filter having a variable resonant frequency. The frequency of resonance tracks the variable FREQ and at resonance the phase shift through the filter is zero. The Q of the filter for $R_1 = R_3$, $C_1 = C_2$, and $R_8 = R_9$ is equal to R2/R1 and has a value of five for the component values of FIG. 3.

The tracking bandpass filter passes the desired fundamental component of the accelerometer 30 output signal at all times while strongly rejecting frequencies above and below this fundamental frequency. At the same time, the tracking bandpass filter maintains approximately zero phase shift to the desired fundamental frequency thereby obviating the need for correcting or accounting for the filter phase shift elsewhere in the system.

Figure 4:
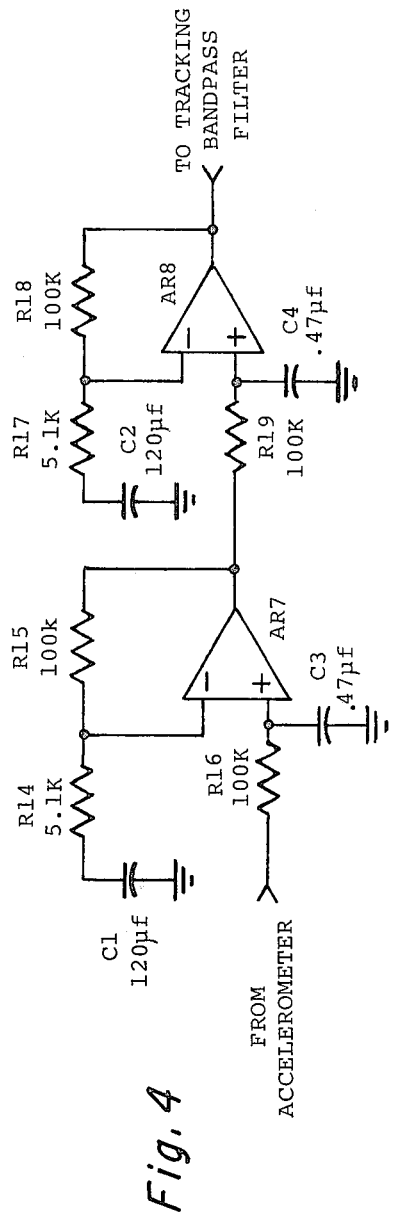
FIG. 4 shows a double integrator circuit for use in the vibrator system.

While one specific type of tracking bandpass filter has been disclosed, other types of tracking bandpass filters may be used without departing from the spirit and scope of the invention. Also, in some cases it may be desirable to include a double integrator with the tracking bandpass filter in the conditioning circuit for the accelerometer signal. One embodiment of such a double integrator is illustrated in the schematic diagram of FIG. 4 wherein, as is well known, each stage of integration is performed by an operational amplifier with feedback as shown. Operational amplifiers AR7 and AR8 may each be the aforementioned Model SN72558 integrated circuit. In one embodiment the integrator would be inserted in line 62 at the point between accelerometer 30 and tracking bandpass filter 32.

There has been disclosed an improved vibratory seismic source capable of operation over an extremely broad bandwidth. An accelerometer located on the pad of the vibrator provides an electrical signal representing the motion of the pad. The output of the accelerometer is used to phase lock the motion of the pad to a reference sweep. Since the output of the accelerometer is generally not monochromatic, a tracking bandpass filter is provided to smooth the accelerometer output. The resonant frequency of the tracking bandpass filter follows the instantaneous frequency of the reference sweep. As a result, the tracking bandpass filter has the desirable features of substantially zero phase shift at the fundamental frequency of the accelerometer signal and of being able to pass this fundament frequency to the relative rejection of all other frequencies.

In another aspect of the invention the conditioning network for the accelerometer output signal may comprise two tracking bandpass filters each of the type illustrated in FIG. 3. In this case, one of the tracking bandpass filters would be tuned to a frequency slightly below the frequency input from sweep generator 10 whiel the other tracking bandpass filter would be tuned to a frequency slightly above this frequency input. Under these conditions the cascade combination of the two tracking bandpass filters would have an overall phase response which varies slowly as a function of frequency in the vicinity of the instantaneous frequency of the sweep waveform. This is advantageous since variation in circuit component values such as those stemming from temperature changes would not introduce unacceptable phase shifts through the tracking bandpass filter combination. The stagger tuning of the two tracking bandpass filters could be accomplished by adding an appropriate digital number to the digital frequency input of one of the tracking bandpass filters while substracting an appropriate digital number from the digital frequency input to the other tracking bandpass filter.

Whereas there has been disclosed one embodiment of a unique vibratory seismic source system, there may be suggested to those skilled in the art minor modifications which do not depart from the spirit and scope of the invention as set forth in the appended claims.

What is claimed is:

1. A control system for a vibratory seismic source comprising:
   a. means for generating a first variable frequency electrical signal representative of the desired motion of said seismic source,
   b. means for generating a second electrical signal representative of the actual motion of said seismic source,
   c. tracking bandpass filter means responsive to said second electrical signal, the frequency response of said tracking bandpass filter means being variable to maintain a local amplitude response peak at the instantaneous frequency of said first electrical signal; and
   d. phase comparator means responsive to said first electrical signal and to the signal produced by said tracking bandpass filter means to generate an error signal for controlling said seismic source.

2. The control system of claim 1 wherein the resonant frequency of said bandpass filter is variable in response to a digital control signal.

3. In a system for imparting vibratory seismic energy to the earth, the combination which comprises:
   a. means for generating a first digital signal, b. a digital to analog converter responsive to said first digital signal to provide a first analog electrical signal for controlling the motion of a hydraulic vibrator, c. means for generating a second analog electrical signal representative of the motion of said hydraulic vibrator, d. a signal conditioning means including a tracking bandpass filter responsive to said second analog electrical signal to provide a modified signal, and e. comparator means responsive to said modified signal and to said means for generating a first digital signal for providing an error signal whereby said first digital signal is modified.

4. The combination of claim 3 wherein the center frequency of said tracking bandpass filter is controlled by said means for generating a first digital signal.

5. The combination of claim 3 wherein said means for generating a second analog electrical signal comprises an accelerometer.

6. The combination of claim 5 wherein said signal conditioning means further comprises automatic gain control means.

7. The combination of claim 5 wherein said signal conditioning means further comprises at least one integrator stage.

8. In a system for the control of a vibratory seismic source wherein a first electrical signal representative of the actual motion of said source is compared with a second signal representing the desired motion of said source to provide an error signal for controlling said source, the improvement which comprises signal conditioning means for said electrical signal comprising in cascade relationship at least two tracking bandpass filters, the center frequencies of said bandpass filters being staggered but at all times approximately equal to the instantaneous frequency represented by said second signal.

9. The improvement of claim 8 wherein the phase shift through said signal conditioning means is approximately zero over a finite band of frequencies located about the instantaneous frequency represented by said second signal.

10. A method of controlling the operation of a variable frequency vibratory seismic source comprising the steps of:

a. controlling a tracking bandpass filter to maintain the peak of its amplitude response near the desired instantaneous frequency of said source, b. providing a signal representative of the motion of said source, c. applying said signal to said tracking bandpass filter.

d. comparing the phase of the signal produced by said tracking bandpass filter with the phase of a reference signal to provide an error signal, and e. controlling the movement of said source by utilizing said error signal.

11. The method of claim 10 wherein said step of controlling a tracking bandpass filter further comprises providing a digital signal representative of the instantaneous frequency of said reference signal, and causing the frequency at which the amplitude response peak of said filter occurs to vary in accordance with said digital signal.

12. A vibratory seismic source comprising:

a. a pad for imparting elastic waves to the underlying earth material, b. hydraulic piston means for applying reciprocating forces to said pad, c. sensor means for providing a first electrical signal representative of the motion of said pad, d. means for generating a second electrical signal representative of the desired motion of said pad, e. tracking bandpass filter means responsive to said first electrical signal, the frequency response of said tracking bandpass filter means being variable to maintain a local amplitude response peak at the instantaneous frequency of said second electrical signal; and f. phase comparator means responsive to said second electrical signal and to the signal produced by said tracking bandpass filter means to generate an error signal for controlling the operation of said hydraulic piston means.

13. The vibratory seismic source of claim 12 wherein the resonant frequency of said tracking bandpass filter is variable in response to a digital control signal.

14. A vibratory seismic source comprising:

a. a hydraulically operated vibrator means, b. means for generating a first digital signal, c. a digital to analog converter responsive to said first digital signal to provide a first analog electrical signal for controlling the motion of said hydraulically operated vibrator means, d. means for generating a second analog electrical signal representative of the motion of said hydraulically operated vibrator means, e. signal conditioning means including a tracking bandpass filter responsive to said second analog electrical signal to provide a modified signal, and f. comparator means responsive to said modified signal and to said means for generating a first digital signal for providing an error signal whereby said first digital signal is modified.

15. The source of claim 14 wherein the center frequency of said tracking bandpass filter is controlled by said means for generating a first digital signal.

16. The source of claim 14 wherein said means for generating a second analog electrical signal comprises an accelerometer.

17. The source of claim 16 wherein said signal conditioning means further comprises automatic gain control means.

18. The source of claim 16 wherein said signal conditioning means further comprises at least one integrator stage.

* * * * *